United States Patent
Chen et al.

(10) Patent No.: US 10,672,101 B1
(45) Date of Patent: Jun. 2, 2020

(54) DRAM WITH SIMULTANEOUS READ AND WRITE FOR MULTIWAFER IMAGE SENSORS

(71) Applicant: OmniVision Technologies, Inc., Santa Clara, CA (US)

(72) Inventors: Chia Ming Chen, San Jose, CA (US); Hoon Ryu, Sunnyvale, CA (US); Qing Qin, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/292,172

(22) Filed: Mar. 4, 2019

(51) Int. Cl.
| | |
|---|---|
| *G06T 1/60* | (2006.01) |
| *H04N 5/335* | (2011.01) |
| *H04N 5/374* | (2011.01) |
| *H04N 5/378* | (2011.01) |
| *G06T 5/50* | (2006.01) |
| *G06T 5/00* | (2006.01) |
| *H04N 5/30* | (2006.01) |

(52) U.S. Cl.
CPC ............... *G06T 1/60* (2013.01); *G06T 5/003* (2013.01); *G06T 5/50* (2013.01); *H04N 5/30* (2013.01); *H04N 5/335* (2013.01); *H04N 5/374* (2013.01); *H04N 5/378* (2013.01)

(58) Field of Classification Search
CPC ......... H01L 27/14634; H01L 27/14636; H01L 27/14643; H01L 27/1464; H01L 27/1469; H01L 27/14638; H04N 5/379; H04N 5/374; H04N 5/378; H04N 5/3745; H04N 5/37455; H04N 5/3742; H04N 5/37457; H04N 5/376; H04N 1/00307; H04N 1/195; H04N 2201/0068; H04N 5/225; H04N 5/2253; H04N 5/232; H04N 5/235; H04N 5/335; H04N 5/347; H04N 5/353; H04N 5/35581; H04N 5/372; H04N 5/3722; H04N 5/3743; H04N 5/37452; H04N 7/142; H04N 5/30; G06T 1/60; G06T 5/003; G06T 5/50
See application file for complete search history.

(56) References Cited

U.S. PATENT DOCUMENTS

| | | | | |
|---|---|---|---|---|
| 5,210,614 | A | * | 5/1993 | Kannegundla ......... H04N 5/335 348/319 |
| 6,707,411 | B1 | * | 3/2004 | Poulton .................... G11C 7/16 341/123 |

(Continued)

*Primary Examiner* — Abdelaaziz Tissire
(74) *Attorney, Agent, or Firm* — Lathrop GPM LLP

(57) ABSTRACT

A bond-per-pixel-block image sensor has a pixel array including multiple pixel blocks with selection circuitry to couple signals to an ADC. The image sensor has an image RAM of DRAM superblocks, each superblock with multiple DRAM blocks each having tristate output driving an image RAM output bus, and data input from several of the ADCs. Each DRAM block has an address multiplexor coupled to read and write addresses. DRAM blocks of each superblock are written simultaneously with data wider than a width of the image RAM output bus. A method of capturing and processing images includes reading a first image frame from pixels of a pixel block through ADCs; writing digital pixel data for the first image frame in a first DRAM superblock; and reading pixel data into an alignment buffer. The method includes overlapping reading the first image frame with writing a second image frame into a second superblock.

6 Claims, 6 Drawing Sheets

(56) References Cited

U.S. PATENT DOCUMENTS

| | | | | |
|---|---|---|---|---|
| 9,578,267 | B2* | 2/2017 | Slovick | H04N 5/378 |
| 2005/0280728 | A1* | 12/2005 | Ishikawa | G06T 1/0007 |
| | | | | 348/294 |
| 2006/0023109 | A1* | 2/2006 | Mabuchi | H01L 24/17 |
| | | | | 348/340 |
| 2006/0044170 | A1* | 3/2006 | Boemler | H03M 1/403 |
| | | | | 341/155 |
| 2006/0220939 | A1* | 10/2006 | Kirsch | H04N 5/335 |
| | | | | 341/155 |
| 2006/0268124 | A1* | 11/2006 | Fishman | H04N 1/2112 |
| | | | | 348/231.99 |
| 2007/0133901 | A1* | 6/2007 | Aiso | G06T 3/4053 |
| | | | | 382/294 |
| 2008/0042046 | A1* | 2/2008 | Mabuchi | H01L 27/14634 |
| | | | | 250/208.1 |
| 2010/0140732 | A1* | 6/2010 | Eminoglu | H01L 27/14634 |
| | | | | 257/447 |
| 2010/0276572 | A1* | 11/2010 | Iwabuchi | H01L 23/481 |
| | | | | 250/208.1 |
| 2013/0320197 | A1* | 12/2013 | Asayama | H01L 25/167 |
| | | | | 250/208.1 |

* cited by examiner

DRAM WITH SIMULTANEOUS READ AND WRITE FOR MULTIWAFER IMAGE SENSORS

BACKGROUND

Typically, bond-per-pixel-block stacked-wafer image sensor designs have a pixel array die with pixels arranged in groups or pixel blocks, with each group containing 8, 16, 32, or 64 pixels, each pixel of the group being read in sequence through an analog-to-digital converter (ADC) into an image memory (image RAM), at least the image RAM being located on a die different than the pixel array die.

Image sensors may generate huge amounts of raw image data. For example, a 24-megapixel image sensor having 12-bit ADCs may generate 288 megabits of data for each raw image frame. Some cameras capture not just a single image, but a burst of four, and sometimes more, images; four 288-megabit images exceeds a gigabit of memory required to store a single burst of raw images. Dynamic memory (DRAM) is preferred for image RAM because of its small cell size for storing such image bursts until images can be processed and compressed.

SUMMARY

A bond-per-pixel-block image sensor has a pixel array of a first die, the pixel array including multiple pixel blocks each with multiple pixels and pixel selection circuitry adapted to couple a signal to an analog-to-digital converter (ADC). The image sensor also has an image random-access memory (image RAM) built of multiple dynamic RAM (DRAM) superblocks, where each superblock includes at least a first and a second DRAM block, each DRAM block with tristate output coupled to drive an image RAM output bus with data read from DRAM of the DRAM block, and a write data input coupled to receive write data from a plurality of the ADCs and provide data to be written to the DRAM of the DRAM block, each DRAM block having an address multiplexor coupled to receive a read address and a write address, and to provide an address to the DRAM of the DRAM block. DRAM blocks of each superblock are configured to be written simultaneously with a width of data from the ADCs greater than a width of the image RAM output bus.

A method of capturing, reordering pixels of, and processing images in a bond-per-pixel-block image sensor including reading pixel data for a first image frame from pixels of a pixel block into an analog-to-digital (ADC) converter; digitizing the pixel data to digital pixel data for the first image frame; writing the digital pixel data for the first image frame into a first DRAM superblock; and reading the digital pixel data for the first image frame into an alignment buffer. The method also includes reading the digital pixel data from the alignment buffer into an image processor, and permits the reading the digital pixel data for the first image frame to overlap writing digital pixel data for a second image frame into a second DRAM superblock, the digital pixel data for the second image frame from obtained by digitizing pixel data from the same pixel block as read for the first image frame.

DETAILED DESCRIPTION OF THE EMBODIMENTS

Figure 1:
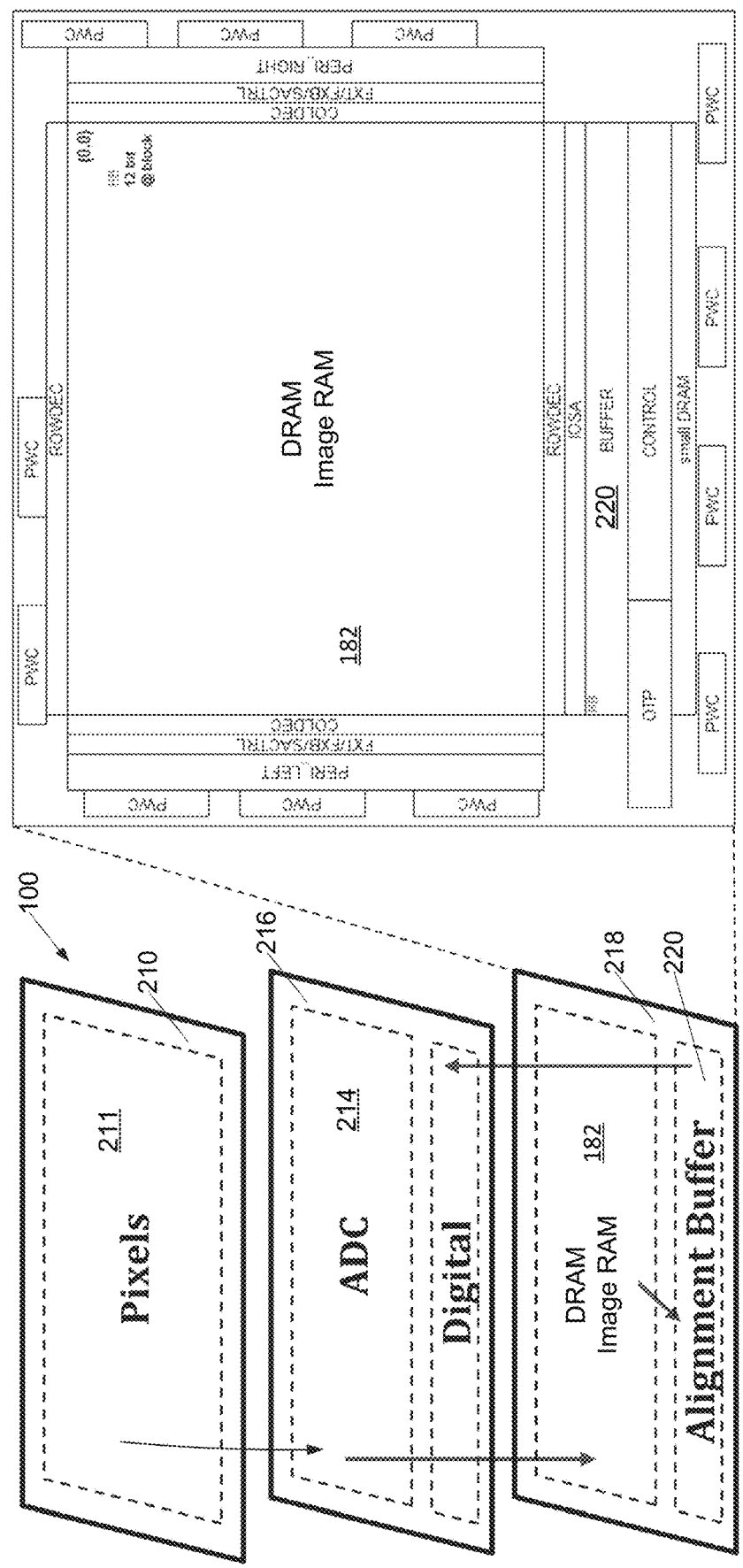
FIG. 1 illustrates significant blocks of an image sensor for a camera having a three-wafer bond-per-pixel image sensor showing information flow between die and blocks.
Figure 2:
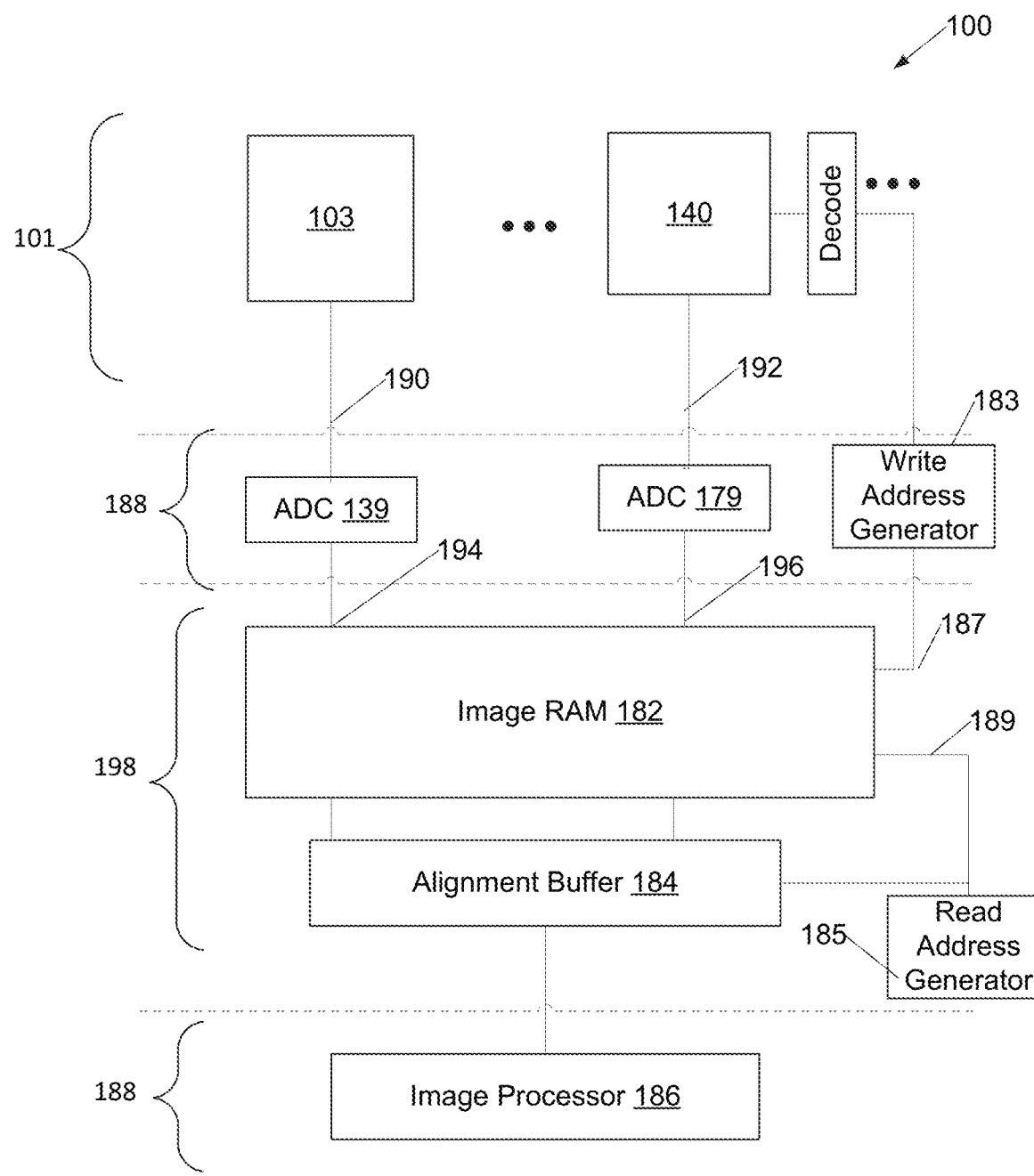
FIG. 2 is a logical block diagram of an image sensor like that of FIG. 1, having a pixel array on a first die, the ADC array on a second die, an image RAM on a third die, and further image processing on the second die.
Figure 3:
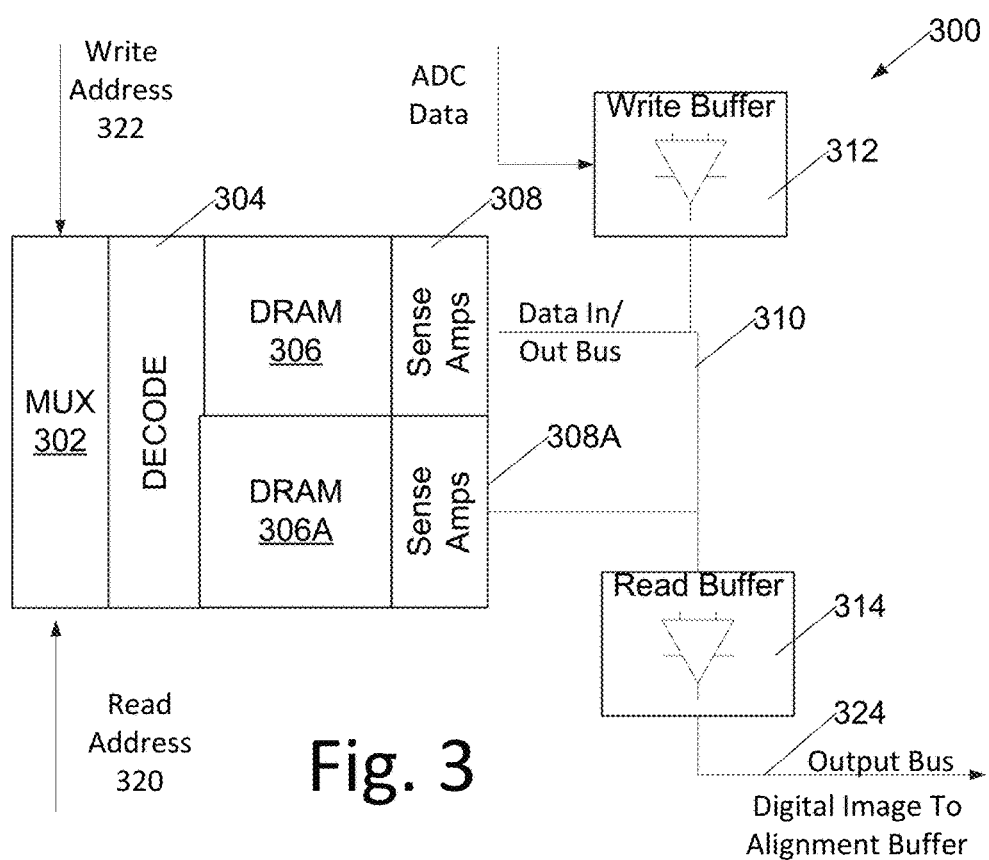
FIG. 3 is a block diagram of a DRAM block.

With reference to FIGS. 1 and 2, a three-wafer (or three-die), stacked, bond-per-pixel-block image sensor 100 receives incoming light onto a pixel array die 210, or portion of a pixel array wafer, of image sensor 100. This light interacts with photodiodes in blocks 103, 140 of pixels of a pixel array 211 of pixel array die 210, 101. Each block 103, 140 has multiple pixels, in example embodiments pixel counts per block may range from four to one hundred twenty-eight, and in a particular embodiment each block has sixty-four pixels. In an embodiment, pixel array die 210, 101 is a backside-illuminated photosensor die including photodiodes and pixel-selection transistors for each pixel within the block, each block having an inter-die bonding pad on a surface of the pixel array die coupled to a separate analog-to-digital converter (ADC) 139, 179, 214 of an ADC and Digital Die 188, 216, the ADC and Digital Die 188, 216 being a portion of a second wafer.

Each ADC 139, 179, 214 of ADC and Digital Die 188, 216 converts signals 190, 192 received from selected pixels of the associated pixel block 103, 140 into digital form, and provides that digital form through through-die vias and inter-die bonding pads 194, 196 to an image RAM 182, 216 on a RAM die 198, 218, the RAM die being a portion cut from a RAM wafer. In a particular embodiment, image RAM 182, 216 is implemented as dynamic RAM (DRAM). Image RAM 182, 216 is sized and configured to hold at least one image as digitized, in one embodiment it holds a single image and in another embodiment it holds a stack of multiple images; in a particular embodiment it holds a stack of four images.

Image RAM 182, 216 is configured to be read through an alignment buffer 184, 220 of RAM die 198, 218, the read-out data sent through inter-die bonding pads of the RAM die that are coupled to inter-die bonding pads and through-die vias of the ADC and Digital Die 188, 216, and thence to image processor 186 of the ADC and Digital Die 188, 216.

In an embodiment, there are many rows and columns of pixel blocks, for example and not limitation a 20-megapixel camera array may have 5120×4096 pixels; in blocks of 16 pixels 1,310,720 blocks in a 1280×1024 array of blocks. In an alternative embodiment using blocks of 64 pixels a similar-sized camera array may have 327,680 blocks in an array of 640×512 pixel blocks.

Because the pixels in each block must be read sequentially through the ADC associated with that block, and are read in parallel with pixels of blocks of the same row of blocks, data from one pixel in each block of a row of blocks is written into each effective write word of image RAM 182.

Writing of image RAM 182 occurs at write addresses generated by a write address generator 183, portions of the write address correspond to addresses used to select pixels of pixel blocks 103, 140. Write address generator 183 may be located on any of the pixel array die 210, ADC and digital die 216, or RAM die 218; since write addresses are generated in a determined sequence, and counters are small relative to die-to-die bonds, portions of write address generator 183, such as a counter, may be duplicated on the pixel array die 210 and RAM die 218. The image RAM has sufficient capacity to store two or more image frames, in a particular embodiment four images.

Once a frame has been written into the image RAM, the image RAM 182 is read block row by block row into the alignment buffer 184. The alignment buffer is then read in a pixel order that best supports image processing into the image processor 186.

Read addresses for the image RAM are generated by a read address generator 185 configured to generate addresses corresponding to portions of image frames being read into the image processor 186.

Write address generator 183 and read address generator 185 generate addresses independently of each other, write address 187 and read address 189 need not correlate. Write address generator 183 may generate write addresses 187 for writing an image frame as very long words of more than 2000 bits into the image RAM in short bursts, while read address generator 185 may generate read addresses 189 for reading a corresponding image frame as shorter words over a greater time period as the image processor 186 accepts and processes the image frame.

The image RAM is composed of DRAM blocks 300. Each DRAM block has an address multiplexor 302, address decoder 304, a dynamic RAM array 306, and sense amplifier/write buffers 308. In some embodiments, there may be multiple dynamic RAM arrays 306A with associated sense amplifier/write buffers 308A. Sense amplifier/write buffers 308 are coupled to a data input/output bus 310 that is driven for writing by write buffers 312, and coupled to an output bus 324 by tristate read buffers 314. Address multiplexor 302 is coupled to select an active DRAM address from a read address 320 and a write address 322. Each DRAM block read address 320 is coupled to read address 189 and each DRAM block write address 322 is coupled to write address 187.

Figure 4:
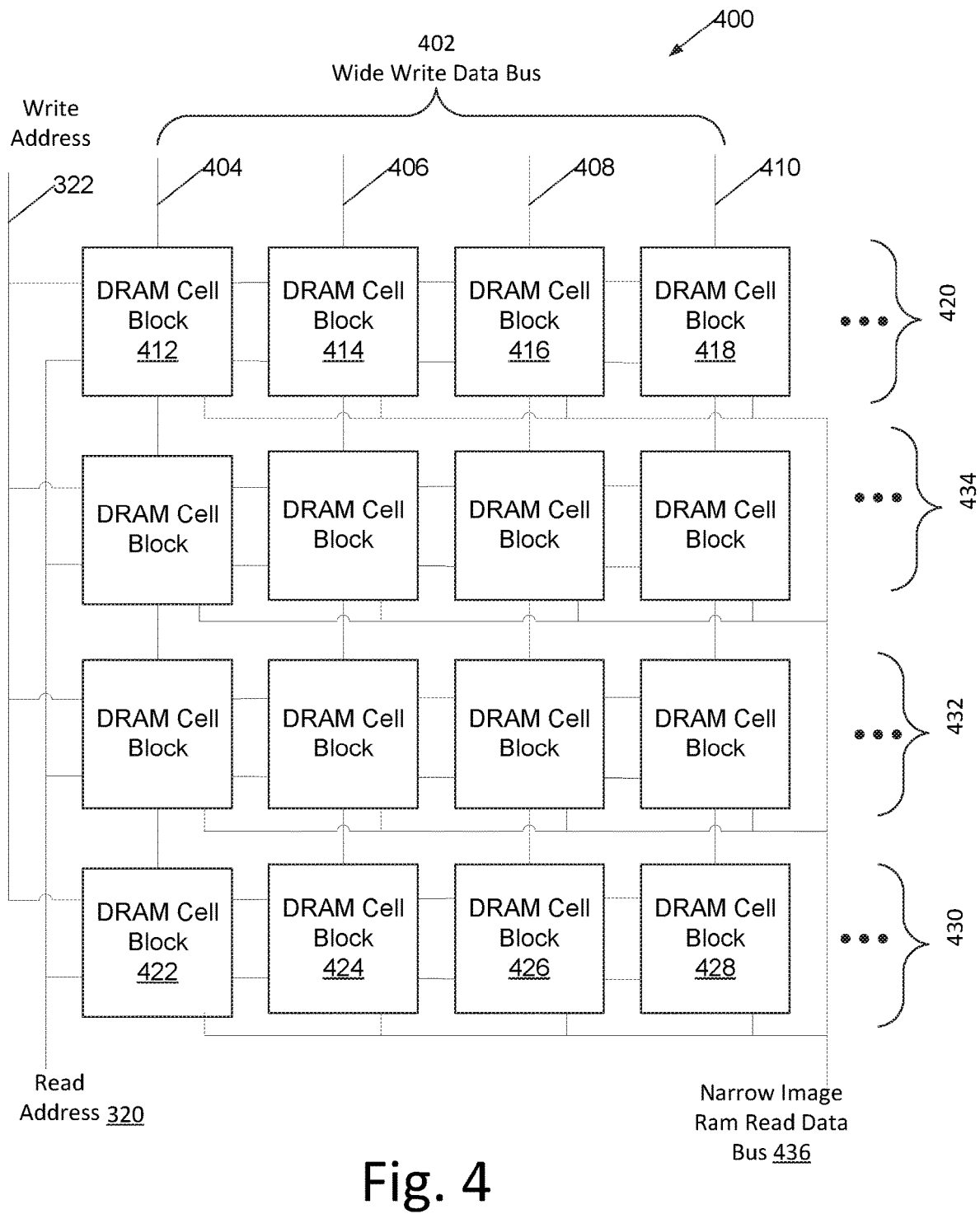
FIG. 4 is a block diagram of an image RAM incorporating the DRAM block of FIG. 3.

DRAM blocks 300 of image RAM 400 are arrayed as illustrated in FIG. 4, illustrating an example having sufficient storage for four frames. Wide write data bus 402, having width sufficient for an ADC output of each pixel block in the pixel array, is divided into write data sub-busses 404, 406, 408, 410 each of width equal to width of a DRAM read bus 436. DRAM blocks 412, 414, 416, 418 form a part of an image-A store 420, or image-A superblock, within image RAM 400, while DRAM blocks 422, 424, 426, 428 form a part of an image B store 430, or image-B superblock within image RAM 400. Additional image stores 432, 434 may exist within image RAM 400 in some embodiments. In a particular embodiment, DRAM block 412 is associated with ADCs associated with a first row of pixel blocks in pixel array 211 of pixel array die 210, while DRAM block 414 is associated with ADCs associated with a second row of pixel blocks in pixel array 211 of pixel array die 210; in this embodiment a width of wide write data bus 402 is determined according to a number of pixel blocks of pixel array 211 and a resolution of each ADC, while a width of narrow image-RAM read data bus 436 is associated with a width of data written to alignment buffer 184, the width of image-RAM read data bus 436 being considerably less than the width of wide write data bus 402.

Each DRAM block has an address multiplexor and is thus dynamically configurable to use either the write address or read address.

Figure 5:
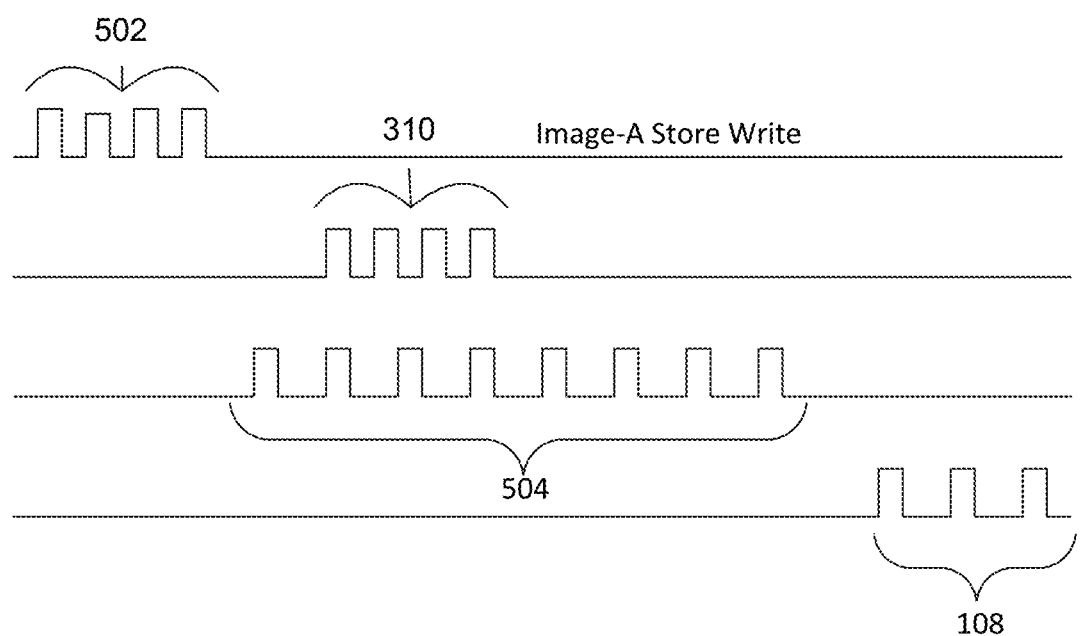
FIG. 5 is a timing diagram illustrating write pulses of DRAM blocks of the image RAM.
Figure 6:
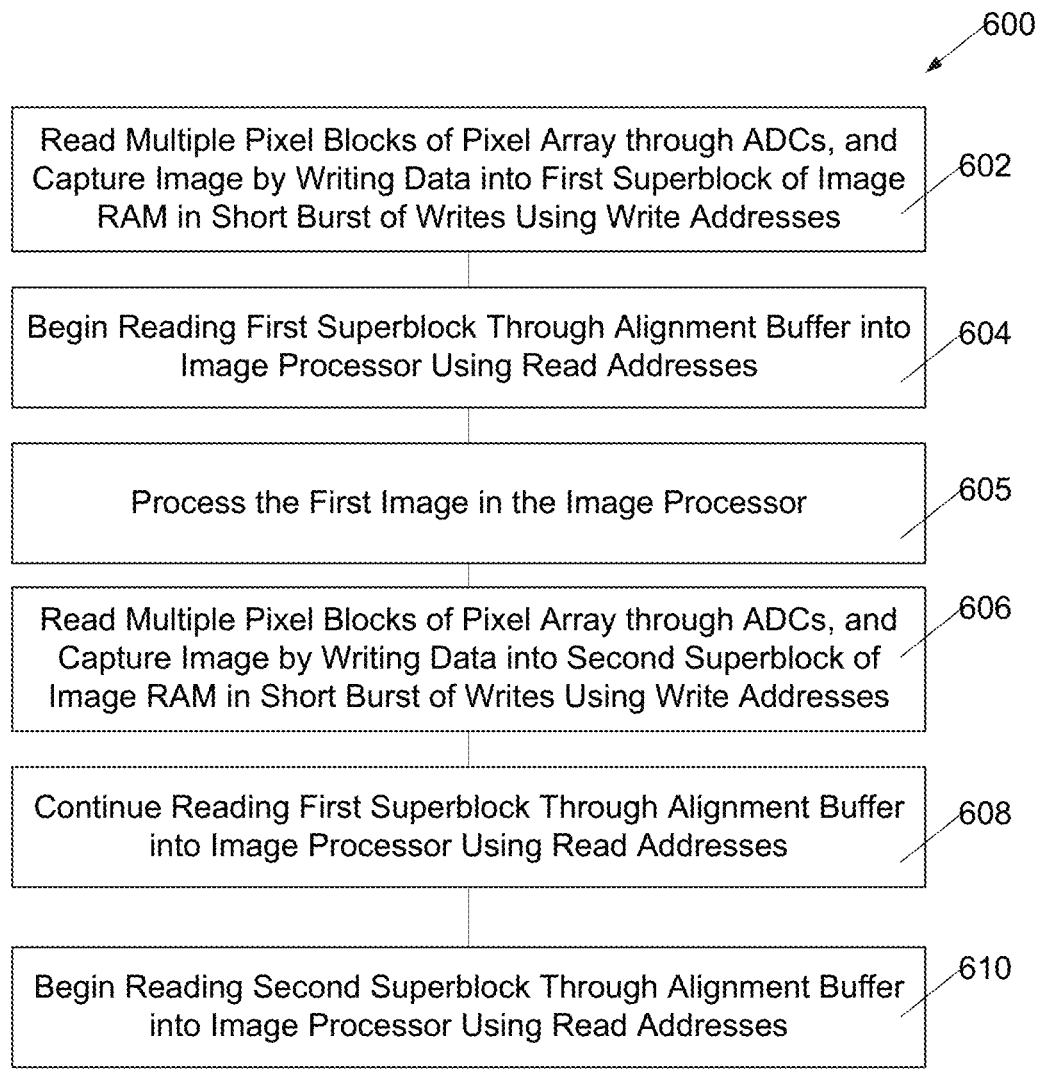
FIG. 6 is a flowchart illustrating operation of the system.

With reference to FIGS. 4, 5, and 6, in an embodiment of a camera system using the image sensor herein described, a first image is captured 602 (FIG. 6) in a first image store, such as image A store superblock 420, during a burst of N image A write pulses 502 (FIG. 5) using the write address at each DRAM block of the image A store, the burst of N image A write pulses 502, including at least one write pulse for each pixel of a pixel block in pixel array 211 of pixel die 210, and serving to write ADC data from those pixels into DRAM of image A store superblock 420.

Once all ADC data of a first image is written into the image A store, the address multiplexors of DRAM blocks of image A store superblock are switched to select the read address while DRAM data of the image A store is read 604, including the first image in digitized form, onto the image RAM read data bus 436 using M read pulses 504. In typical embodiments, M, the number of read pulses, is a multiple greater than two times N, the number of write pulses. Read pulses may occur at a different rate than the write pulses that wrote the data into the image A store, and are timed according to ability of the image processor 186 to accept image data. As first digital image data is read from the image A store, that data is passed through the alignment buffer 184 and into image processor 186 where the first digital image is processed—image processing in some embodiments includes color processing and image compression, as well as red-eye reduction. In some embodiments, image processing may include edge detection, identification of moving edges in an image frame, performing digital image stabilization, and performing blur reduction while combining image data from multiple frames.

Once the first image is fully captured in the first image store, such as image A store superblock 420, a second image may be captured 606 in a second image store, such as image B store superblock 430, of image DRAM 400, using the same number N of image write pulses used to capture the first image in image A store 420. Capturing each image in an image store superblock requires reading pixel data for each pixel of pixel blocks onto die-to-die bonds and into the associated ADC, thence reading ADC data representing that pixel data and writing that digitized pixel data into the DRAM of the image store superblock. Capturing the second image into image B store occurs at a time determined according to a photographer's desired photographic effects including a desired frame rate, this writing may begin immediately after writing the image A store is completed but in most embodiments and uses of the image sensor is delayed according to a configurable frame-to-frame delay and exposure time.

Writing of image B store superblock 430 may overlap reading of image A store onto image RAM read data bus 436, as shown, and thus may overlap processing of image A images in alignment buffer 184 and image processor 186; if reading of image A superblock 420 has not been completed by the time writing of image B superblock 430 completes, reading of image A superblock 420 continues 608 until complete. Once reading of image A superblock 420 completes, reading of image B superblock may begin 610. Similarly, additional images may be captured in additional image stores 432, 434, while either image A or image B is being read onto image RAM read data bus 436 and processed in alignment buffer 184 and image processor 186.

Once an image, such as the first image stored in image A store superblock 420, has been fully read onto image RAM read data bus 436, that image store may be recycled for use in capturing further images.

The bond-per-pixel-block image sensor herein is of use in cameras that rapidly capture short sequences of frames, including those that capture multiple individual image frames, identify movement of imaged objects and scenery, between frames, and process the images to produce composite images with greater light sensitivity and less motion blur than achievable with single-exposure images. A bond-per-pixel-block image sensor designated A has a pixel array of a first die, the pixel array including multiple pixel blocks each with multiple pixels and pixel selection circuitry adapted to couple a signal to an analog-to-digital converter (ADC). The image sensor also having an image random-access memory (image RAM) built of multiple dynamic RAM (DRAM) superblocks, where each superblock includes at least a first and a second DRAM block, each DRAM block with tristate output coupled to drive an image RAM output bus with data read from DRAM of the DRAM block, and a write data input coupled to receive write data from a plurality of the ADCs and provide data to be written to the DRAM of the DRAM block, each DRAM block having an address multiplexor coupled to receive a read address and a write address, and to provide an address to the DRAM of the DRAM block. DRAM blocks of each superblock being configured to be written simultaneously with a width of data from the ADCs greater than a width of the image RAM output bus.

Combinations

The concepts described herein may be combined in various ways. Among combinations anticipated by the inventors are:

A bond-per-pixel-block image sensor designated A including: a pixel array located on a first integrated circuit die, the pixel array with pixel blocks each having multiple pixels with pixel selection circuitry adapted to couple a signal corresponding to a selected pixel to a first die-to-die bond associated with that pixel block; an analog-to-digital converter (ADC) coupled to the first die-to-die bond associated with each pixel block; and an image random-access memory (image RAM) comprising dynamic RAM (DRAM) superblocks. Each DRAM superblock includes at least a first and a second DRAM block, each DRAM block having a tristate output coupled to drive an image RAM output bus with data read from a DRAM of the DRAM block, and a write data input coupled to receive write data from a plurality of the ADCs and provide data to be written to the DRAM of the DRAM block, each DRAM block having an address multiplexor coupled to receive a read address and a write address, and to provide an address to the DRAM of the DRAM block; and multiple DRAM blocks of each superblock are configured to be written simultaneously with a width of data from the ADCs greater than a width of the image RAM output bus.

A bond per pixel block image sensor designated AA including the image sensor designated A wherein each DRAM block has a data input-output bus driven by a tristate driver from the write data input, and the tristate output is driven from the data input-output bus by a tristate driver.

A bond per pixel block image sensor designated AB including the image sensor designated A or AA where each DRAM block comprises a plurality of DRAM sub-blocks sharing a common address decoder and having separate sense amplifiers coupled through tristate drivers to the data input-output bus.

A bond per pixel block image sensor designated AC including the image sensor designated A, AA, or AB wherein the image RAM output bus is coupled through an alignment buffer to an image processor.

A method designated B of capturing, reordering pixels of, and processing images in a bond-per-pixel-block image sensor including reading pixel data for a first image frame from pixels of a pixel block into an analog-to-digital (ADC) converter; digitizing the pixel data to digital pixel data for the first image frame; writing the digital pixel data for the first image frame into a first DRAM superblock; and reading the digital pixel data for the first image frame into an alignment buffer. The method also includes reading the digital pixel data from the alignment buffer into an image processor, and requires the reading the digital pixel data for the first image frame overlap writing digital pixel data for a second image frame into a second DRAM superblock, the digital pixel data for the second image frame from obtained by digitizing pixel data from the same pixel block as read for the first image frame.

A method designated BA including the method designated B where the image processor performs blur reduction upon combining multiple image frames.

The image sensor system described herein may incorporate additional features without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A bond-per-pixel-block image sensor comprising:
   a pixel array located on a first integrated circuit die, the pixel array including a plurality of pixel blocks each comprising a plurality of pixels with pixel selection circuitry adapted to couple a signal corresponding to a selected pixel of the plurality of pixels to a first die-to-die bond associated with that pixel block;
   an analog-to-digital converter (ADC) coupled to the first die-to-die bond associated with each pixel block;
   an image random-access memory (RAM) comprising a plurality of dynamic RAM (DRAM) superblocks, where each superblock comprises:
   at least a first and a second DRAM block, each DRAM block having a tristate output coupled to drive an image RAM output bus with data read from a DRAM of the DRAM block, and a write data input coupled to receive write data from a plurality of the ADCs and provide data to be written to the DRAM of the DRAM block; and
   a plurality of DRAM blocks of each superblock being configured to be written simultaneously with a width of data from the ADCs greater than a width of the image RAM output bus;
   the bond-per-pixel image sensor configured to permit reading of the first DRAM block using an address provided to the first DRAM block through a first address multiplexor to overlap writing of the second DRAM block, the writing of the second DRAM block using an address provided to the second DRAM block by a second address multiplexor; the first multiplexor being coupled to receive a read address and a write address and the second address multiplexor being coupled to receive the read address and the write address; and the bond-per-pixel image sensor being configured to write data from each pixel block of a row of pixel blocks into DRAM simultaneously.

2. The bond per pixel block image sensor of claim 1 wherein each DRAM block has a data input-output bus driven by a tristate driver from the write data input, and the tristate output is driven from the data input-output bus by a tristate driver.

3. The bond per pixel block image sensor of claim 2 wherein each DRAM block comprises a plurality of DRAM sub-blocks sharing a common address decoder and having separate sense amplifiers coupled through tristate drivers to the data input-output bus.

4. The bond per pixel block image sensor of claim 1 wherein the image RAM output bus is coupled through an alignment buffer to an image processor.

5. A method of capturing, reordering pixels of, and processing images in a bond-per-pixel-block image sensor comprising:
   reading pixel data for a first image frame from pixels of a pixel block into an analog-to-digital (ADC) converter;
   digitizing the pixel data to digital pixel data for the first image frame;
   writing the digital pixel data for the first image frame into a first DRAM superblock using at least a first address multiplexor to address at least a first block of the first DRAM superblock; the writing the digital pixel data into the DRAM superblock comprising writing digital pixel data from each pixel block of a row of pixel blocks into the DRAM superblock simultaneously reading the digital pixel data for the first image frame into an alignment buffer; and
   reading the digital pixel data from the alignment buffer into an image processor;
   where the reading the digital pixel data for the first image frame overlaps writing digital pixel data for a second image frame into a second DRAM superblock using at least a second address multiplexor to address at least a first block of the second DRAM superblock, the digital pixel data for the second image frame from obtained by digitizing pixel data from the same pixel block as read for the first image frame.

6. The method of claim 5 where the image processor performs blur reduction upon combining multiple image frames.

* * * * *